US006857491B2

(12) United States Patent
Wakashiro et al.

(10) Patent No.: US 6,857,491 B2
(45) Date of Patent: Feb. 22, 2005

(54) CONTROL APPARATUS FOR HYBRID VEHICLE

(75) Inventors: Teruo Wakashiro, Shioya-gun (JP); Atsushi Matsubara, Utsunomiya (JP); Yasuo Nakamoto, Utsunomiya (JP); Shigeo Hidai, Utsunomiya (JP); Hideyuki Takahashi, Utsunomiya (JP); Kan Nakaune, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 61 days.

(21) Appl. No.: 10/051,046

(22) Filed: Jan. 22, 2002

(65) Prior Publication Data

US 2002/0112903 A1 Aug. 22, 2002

(30) Foreign Application Priority Data

Feb. 20, 2001 (JP) ................................ P2001-043928

(51) Int. Cl.⁷ ............................................... B60K 6/02
(52) U.S. Cl. .............. 180/65.2; 180/65.4; 123/198 DB; 123/481
(58) Field of Search .............................. 180/65.2, 65.3, 180/65.4, 165; 477/2, 3; 123/198 F, 481, 198 DB; 290/41, 40 C; 322/14, 15, 16; 701/22, 112, 99, 103, 105

(56) References Cited

U.S. PATENT DOCUMENTS 4,414,936 A * 11/1983 Huff ..................... 123/198 F
5,725,064 A * 3/1998 Ibaraki et al. ............. 180/65.2
5,975,052 A * 11/1999 Moyer .................... 123/406.23
6,223,846 B1 * 5/2001 Schechter ................... 180/165
6,247,437 B1 * 6/2001 Yamaguchi et al. ..... 123/179.3
6,360,728 B1 * 3/2002 Sturman ..................... 123/508
6,487,998 B1 * 12/2002 Masberg et al. ......... 123/192.1
6,718,944 B2 * 4/2004 Franke et al. .......... 123/406.29

FOREIGN PATENT DOCUMENTS

| JP | 6-51817 | 3/1994 |
| JP | 06-058187 | 3/1994 |

* cited by examiner

Primary Examiner—Christopher P. Ellis
Assistant Examiner—Brian Swenson
(74) Attorney, Agent, or Firm—Armstrong, Kratz, Quintos, Hanson & Brooks, LLP

(57) ABSTRACT

In a control apparatus for a hybrid vehicle having an engine and a motor as a driving source, the control apparatus stops fuel supply to the engine by a fuel supply stop device during deceleration, and performs regenerative braking by the motor depending on the deceleration state, wherein the engine is a type of engine capable of executing cylinders deactivated operation for at least one cylinder, and the control apparatus comprises the cylinders deactivated operation execution flag F_ALCS for determining whether it is appropriate for cylinders to enters into the deactivated operation based on the traveling conditions of a vehicle and a variable valve timing mechanism for deactivating the operation of the cylinders of the engine when the cylinders deactivated operation is determined. Furthermore, when the fuel supply to the engine is stopped during deceleration, the cylinder deactivated operation is performed based on the all cylinders deactivated operation execution flag F_ALCS and the variable valve timing system.

3 Claims, 10 Drawing Sheets

CONTROL APPARATUS FOR HYBRID VEHICLE

BACKGROUND OF THE INVENTION

1. Field of the Invention

The present invention relates to a control apparatus for a hybrid vehicle, and in particular, relates to a control apparatus for a hybrid vehicle that can improve fuel consumption by a cylinder deactivated operation of an engine under certain conditions.

2. Description of the Related Art

Conventionally, hybrid vehicles having an engine and a motor as a drive source for a vehicle are known. One type of such a hybrid vehicles is a parallel hybrid vehicle in which the drive output from the engine is assisted by the motor.

In the parallel hybrid vehicle, at the time of acceleration the driving power output from the engine is assisted by the motor, while at the time of deceleration, various control is carried out such as performing battery charging by deceleration regeneration, so that the remaining charge (electrical energy) of the battery can be increased while satisfying the requirements of the driver. Furthermore, since the structural mechanism is such that the engine and the motor are arranged in series, the structure can be simplified, and the whole system can be reduced to a low weight. Therefore, there is an advantage in that there is a high degree of freedom in vehicle assembly.

In order to eliminate the influence of engine friction (engine braking) at the time of deceleration regeneration, several mechanisms have been proposed for the aforementioned parallel hybrid vehicle, such as a mechanism which includes a clutch between the engine and motor (for example, refer to Japanese Unexamined Patent Application, First Publication No. 2000-97068) or the engine, motor and transmission are connected in series (for example, refer to Japanese Unexamined Patent Application, First Publication No. 2000-125405) in order to achieve maximum simplification.

However, in the former mechanism comprising a clutch between the engine and motor, have drawbacks in that the structure becomes complicated by inserting the clutch and the assembly capability of the vehicle is reduced so that insertion of the clutch reduces transmission efficiency of the power transmission system. On the other hand, in the latter construction in which the engine, motor and transmission are connected in series, since the regeneration energy is reduced by the aforementioned friction of the engine, the electrical energy that could be conserved by regeneration is reduced. Therefore, there is a problem in that the assist amount by the motor is limited.

A measure to reduce the friction loss during deceleration is proposed to control the throttle valve in the opening side in the deceleration mode of the vehicle by employing an electronic controlled throttle mechanism for sharply reducing the pumping losses and for increasing the deceleration regeneration. However, since a large amount of fresh air normally flows into the exhaust system, it reduces the temperature of the catalyst and an A/F (air/fuel) sensor, so that the optimum control of the exhaust gas is degraded.

SUMMARY OF THE INVENTION

Therefore, the present invention provides a control apparatus of a hybrid vehicle, capable of remarkably increasing the amount of regeneration without hurting the optimum control of the exhaust gas so that the fuel consumption can be improved to a large extent by the motor assist.

To solve the above-described problems, a first aspect of the invention provides a control apparatus for a hybrid vehicle having an engine (for example, engine E in the embodiment) and a motor (for example, motor M in the embodiment) as the drive source, wherein a fuel supply to the engine is stopped by a fuel supply stop device (for example, step S212 in the embodiment) at the time of deceleration, and performs regenerative braking by the motor depending on the deceleration state, wherein the engine is a type of engine capable of executing the all cylinders deactivated operation, and the control device comprises a cylinder deactivated operation determination device (for example, an all cylinders deactivated operation execution flag F_ALCS in the embodiment) for determining whether the cylinders should be deactivated depending on the running conditions of the vehicle, and a cylinder deactivated operation execution device (for example, variable valve timing mechanism VT in the embodiment) for executing the all cylinders deactivated operation of the engine when cylinder deactivated operation is determined by the cylinder deactivated operation determination device, and when the fuel supply to the engine is stopped by the fuel supply stop device during deceleration, the cylinders are deactivated based on the cylinder deactivated operation determination device and the cylinder deactivated operation execution device.

By constituting the control apparatus of a hybrid vehicle as described above, while fuel supply to the engine is stopped by the fuel supply stop device, if the cylinder deactivated operation determination device determines to execute the cylinder deactivated operation, it becomes possible to execute the cylinders deactivated operation of the engine by the cylinder deactivated operation execution device.

According to the second aspect of the present invention, the control apparatus comprises a cylinder deactivated operation detecting device (for example, all cylinders deactivated operation solenoid flag F_ALCSSOL) for detecting the operation or non-operation of the cylinder deactivated operation execution device, and when the cylinder deactivated operation determination device determines that the cylinder deactivated operation is released, and the cylinder deactivated operation detecting device detects an inoperative state of the cylinder deactivated operation execution device, the fuel supply stop to the engine by the fuel supply stop device is released.

By constituting the control apparatus of a hybrid vehicle as described above in the second aspect, when the cylinder deactivated operation determination device determines that the cylinder deactivated operation is released, and the cylinder deactivated operation detecting device detects an inoperative state of the cylinder deactivated operation execution device, the fuel supply stop to the engine by the fuel supply stop device is released, so that fuel supply can be restarted.

According to the third aspect of the present invention, the cylinder deactivated operation execution device closes both the intake valves (for example, intake valve IV in the embodiment) and exhaust valves (for example, exhaust valve EV in the embodiment) of the cylinders.

By constituting the control apparatus of a hybrid vehicle as described above in the third aspect, when the cylinders enters into the deactivated operation, engine pumping losses and friction are reduced, and it is possible to prevent fresh air from flowing into the exhaust system.

According to the fourth aspect of the invention, when fuel supply is restarted by releasing the fuel supply stop to the engine by the fuel supply stop device, fuel is gradually increased to a predetermined amount (for example, an incremental amount DKAALCS in the embodiment) depending on the degree of the throttle opening (for example, throttle opening TH).

By constituting the control apparatus of a hybrid vehicle as described above in the fourth aspect, when fuel supply is restarted by releasing the fuel supply stop to the engine by the fuel supply stop device, it is possible to prevent the fuel supply amount from increasing rapidly.

DETAILED DESCRIPTION OF THE INVENTION

Hereinafter, embodiments of the present invention are described with reference to the attached drawings.

Figure 1:
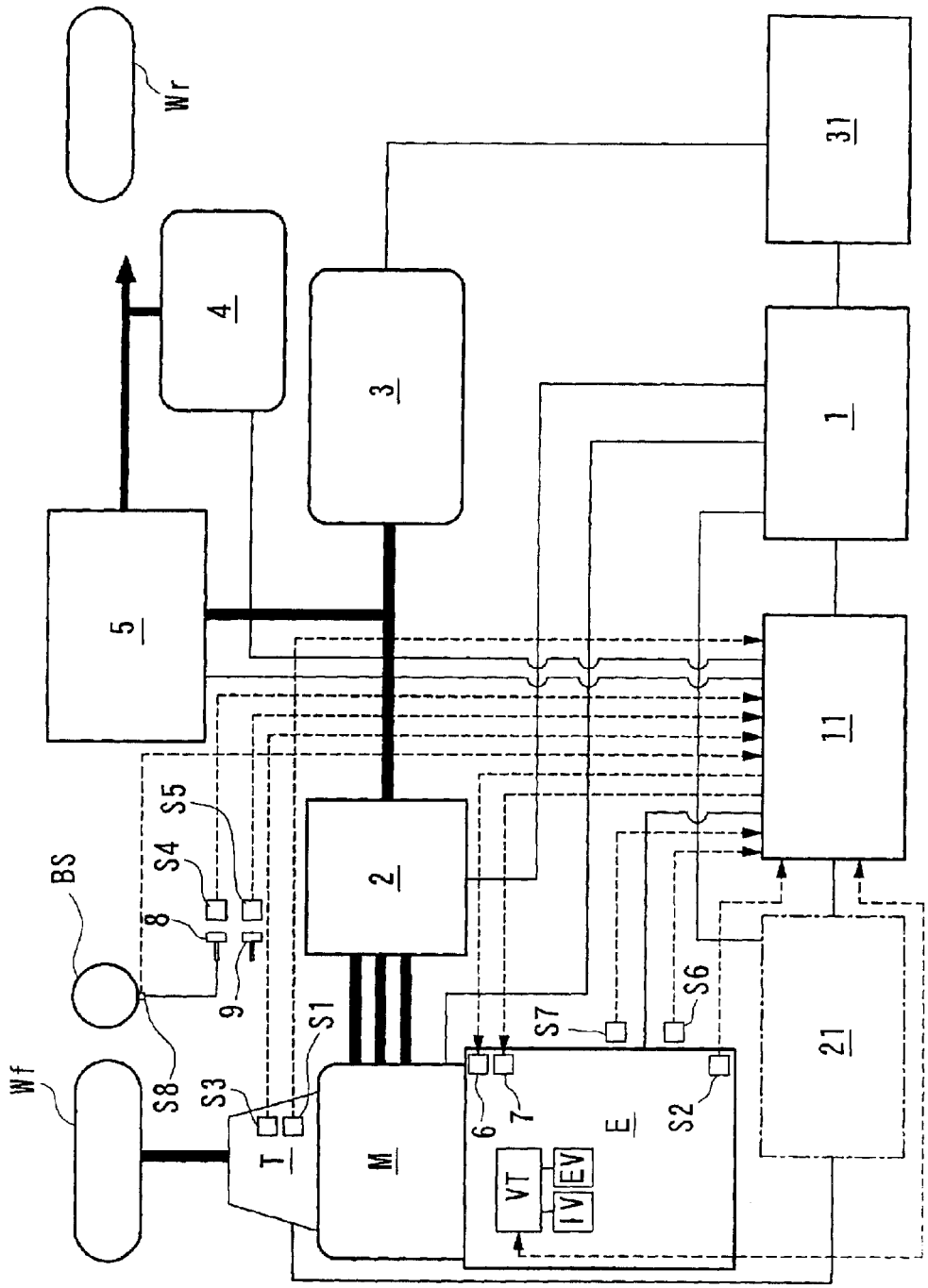
FIG. 1 is a block diagram showing a parallel hybrid vehicle according to one embodiment of the present invention.

FIG. 1 shows a parallel hybrid vehicle of an embodiment of the present invention, in which an engine E, a motor M and a transmission T are connected in series. The driving forces from both the engine E and the motor M are transmitted to front wheels Wf serving as drive wheels via the transmission T comprising either an automatic transmission or a manual transmission. Furthermore, when a driving force is transmitted to the motor M side from the front wheels Wf at the time of deceleration of the hybrid vehicle, the motor M functions as a generator to produce so called regenerative braking, and the kinetic energy of the vehicle is recovered as electrical energy. The rear wheels are designated as Wr.

The drive and regenerative braking of the motor M are controlled by a power drive unit 2, which receives control instructions from the motor ECU 1. A battery 3 of a high-tension system for transferring electrical energy to and from the motor M is connected to the power drive unit 2. The battery 3 is constructed from individual modules wherein, for example, a plurality of cells is connected in series, with a plurality of these modules connected in series. Mounted on the hybrid vehicle is a 12 volt auxiliary battery 4 for driving various auxiliary equipment. This auxiliary battery 4 is connected to the battery 3 via a down converter 5. The down converter 5, which is controlled by the FIECU 11, reduces the voltage of the battery 3 to charge the auxiliary battery 4.

The FIECU 11, in addition to the motor ECU 1 and the down converter 5, controls the operation of a fuel supply amount control device 6 for controlling the amount of fuel supplied to the engine E, the operation of a starter motor 7, and also the ignition timing. Therefore, inputs to the FIECU 11 are: a signal from a speed sensor S1 for detecting the speed V based on the speed of rotation of a drive shaft in the transmission T, a signal from an engine rotation speed sensor S2 for detecting engine rotation speed NE, a signal from a gear shift position sensor S3 for detecting the shift position of the transmission T, a signal from a brake switch S4 for detecting the operation of a brake pedal 8, a signal from a clutch switch S5 for detecting the operation of a clutch pedal 9, a signal from a throttle opening sensor S6 for measuring the throttle opening TH, and a signal from an inlet pipe negative pressure sensor S7 for detecting inlet pipe negative pressure PBGA. Numeral 31 denotes a battery ECU that protects the battery 3, and computes the remaining charge QBAT of the battery 3. Here, in the case of a CVT vehicle, a CVT control CVTECU 21 is installed as shown by broken lines in FIG. 1.

BS denotes a brake servo connected to a brake pedal 8, and a negative pressure sensor S8 for detecting the master power internal negative pressure (MPGA) of the brake is installed in this brake servo BS.

This negative pressure sensor S8 is connected to an engine ECU 11.

Here, the abovementioned engine E is a type of engine capable of switching between all cylinders operating (normal operation) in which all cylinders operate, and all cylinders deactivated operation, in which all cylinders are deactivated. As shown in FIG. 1, typically the intake valve IV and exhaust valve EV of each cylinder of the engine E are constructed such that their operation can be deactivated by a variable valve timing system VT (cylinder deactivated operation execution device). Here, the variable valve timing system VT is connected to the engine ECU 11.

A specific description will be given using FIG. 2 and FIG. 3.

Figure 2:
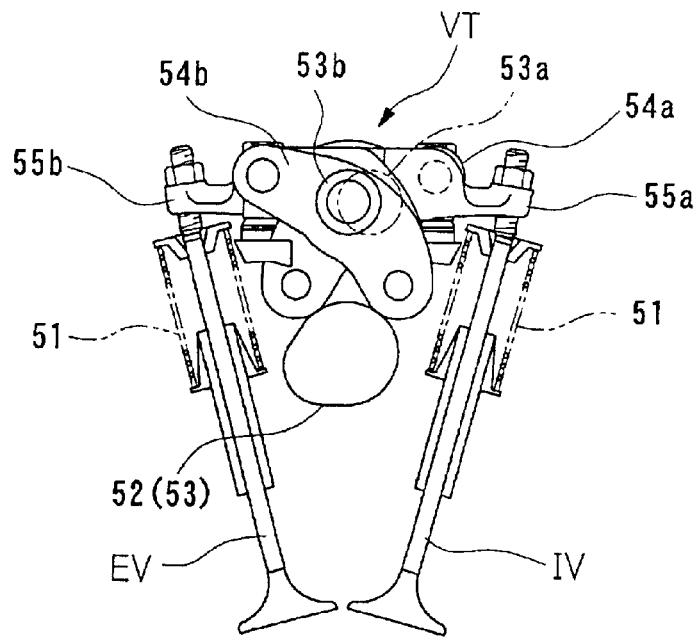
FIG. 2 is a front view of a variable valve timing mechanism of the embodiment of the present invention.

FIG. 2 shows an example in which a variable valve timing system VT for all cylinders deactivated operation is applied in a SOHC type engine. An intake valve IV and an exhaust valve EV are installed in a cylinder, which is not shown in the figure, and the intake valve IV and exhaust valve EV are mounted at an angle such that the intake and exhaust ports, which are not shown in the figure, are closed by valve springs 51. Also, numeral 52 denotes a lift cam installed on a cam shaft 53. Intake valve and exhaust valve cam lift rocker arms 54a and 54b are linked to this lift cam 52, mounted so as to rotate via intake valve and exhaust valve rocker arm shafts 53a and 53b.

Furthermore, valve drive rocker arms 55a and 55b are rotatably mounted on each of the rocker arm shafts 53a and 53b, adjacent to the cam lift rocker arms 54a and 54b. The moving ends of the rotatable valve drive rocker arms 55a and 55b press the top ends of the intake valve IV and the exhaust valve EV in order to operate the opening of the intake valve IV and the exhaust valve EV. Here, the base ends (opposite ends from the valve interface) of the valve drive rocker arms 55a and 55b are constructed such that they are able to slide on a perfect circle cam 531 installed on the cam shaft 53.

FIG. 3 shows the cam lift rocker arm 54b and the valve drive rocker arm 55b using the exhaust valve as an example.

Figure 3A:
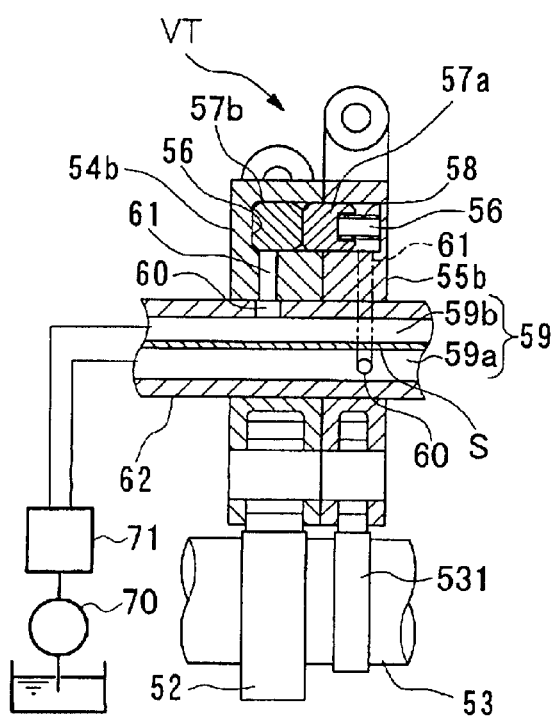
FIG. 3A is a sectional view of the main parts of the variable valve timing mechanism in an all cylinders normal operation state, and 3B is a sectional view of the main parts of the variable valve timing mechanism in an all cylinders deactivated operation state.
Figure 3B:
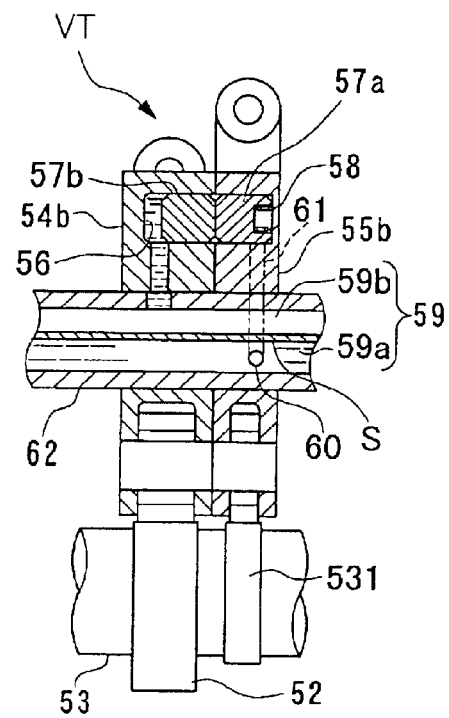
FIG. 3 shows the variable valve timing mechanism of the embodiment of the present invention.

In FIG. 3(a) and FIG. 3(b), an oil pressure chamber 56 is formed on the opposite side from the lift cam 52, with the exhaust valve rocker arm shaft 53b in the center, in the cam lift rocker arm 54b and the valve drive rocker arm 55b, which extends over both the cam lift rocker arm 54b and the valve drive rocker arm 55b. Inside the oil pressure chamber 56, pins 57a and 57b are installed such that these can slide freely. These pin 57a and 57b is urged toward the cam lift rocker arm 54b side via a pin spring 58.

Furthermore, an oil pressure supply path 59 is formed inside the exhaust valve rocker arm shaft 53b. This oil pressure supply path 59 is communicated with the oil pressure chamber 56 via an opening 60 of the oil pressure supply path 59 and a communication path 61 of the cam lift rocker arm 54b. Working fluid is supplied from an oil pump P to the oil pressure supply path 59 by switching a spool valve SV. The solenoid of this spool valve SV is connected to the engine ECU 11.

Here, in a case where oil pressure is not applied from the oil pressure supply path 59, as shown in FIG. 3A, pins 57a and 57b are positioned by the pin spring 58 such that it extends between the cam lift rocker arm 54b and the valve drive rocker arm 55b. On the other hand, if oil pressure is applied from the oil supply path 59 by a cylinder deactivated operation signal, as shown in FIG. 3(b), the pin 57 slides to the valve drive rocker arm 55b side against the pin spring 58, and releases the link between the cam lift rocker arm 54b and the valve drive rocker arm 55b. Here, the intake valve has the same construction.

Accordingly, when the conditions for all cylinders deactivated operation as mentioned later are satisfied, oil pressure is applied from the oil pressure supply path 59 to the oil pressure chamber 56 on both the intake valve and exhaust valve via an oil pressure supply device (not shown in the figure) by a signal from the engine ECU 11. Then, the pins 57 which had linked the cam lift rocker arms 54a and 54b and the valve drive rocker arms 55a and 55b, slide toward the valve drive rocker arms 55a and 55b sides, and the links between the cam lift rocker arms 54a and 54b and the valve drive rocker arms 55a and 55b are released.

As a result, the cam lift rocker arms 54a and 54b are driven by the rotary movement of the lift cam 52. However, the valve drive rocker arms 55a and 55b, whose links with the cam lift rocker arms 54a and 54b by the pins 57 were released, are not driven by either the idle running perfect circle cam 537 or the cam lift rocker arms 54a and 54b, and hence they do not contribute to the opening of the valves IV and EV. As a result, the valves IV and EV remain closed, which enables the all cylinders deactivated operation.

[MA (Motor) Basic Modes]

Figure 4:
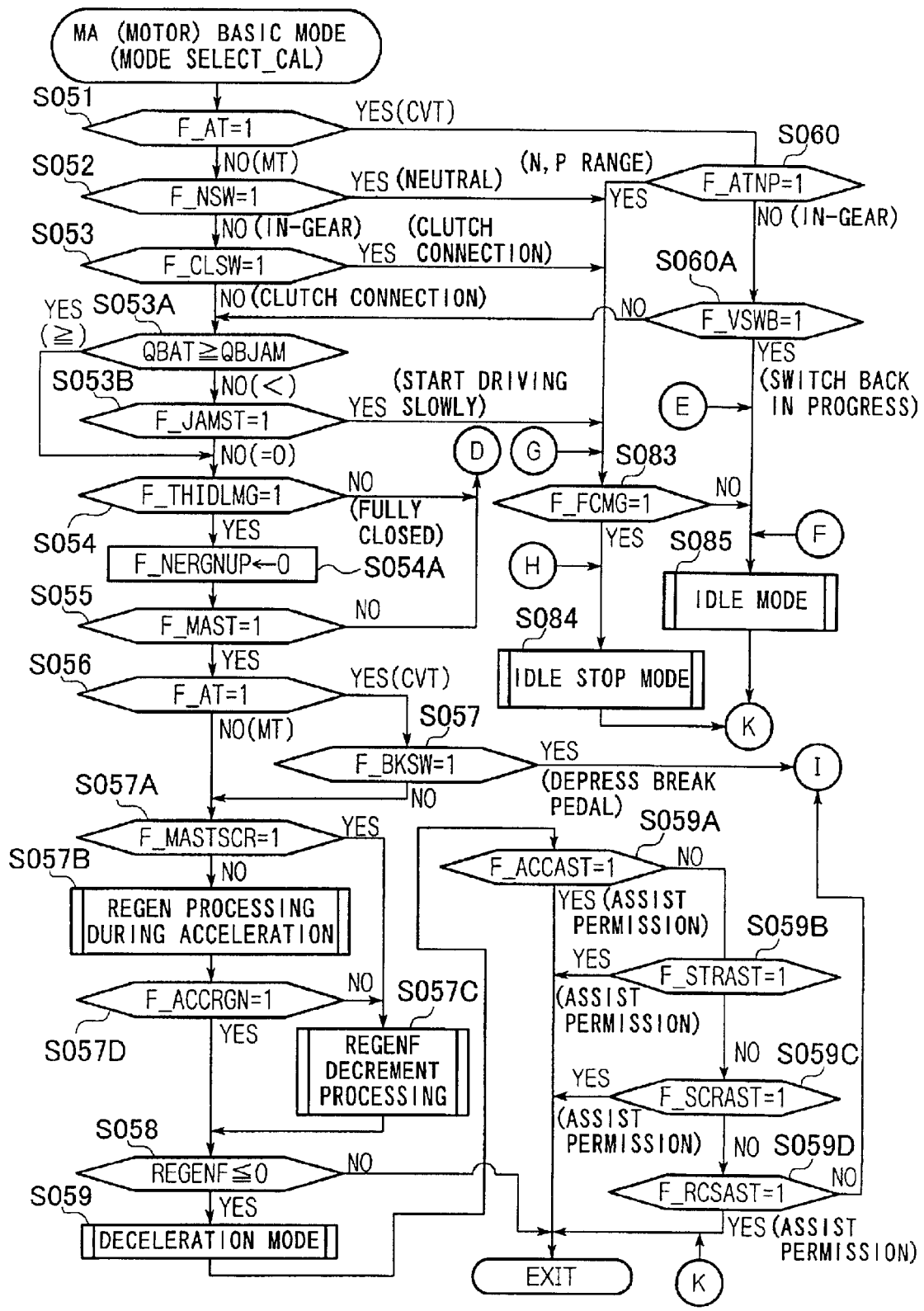
FIG. 4 is a flow chart showing an MA (motor) basic mode of the embodiment of the present invention.
Figure 5:
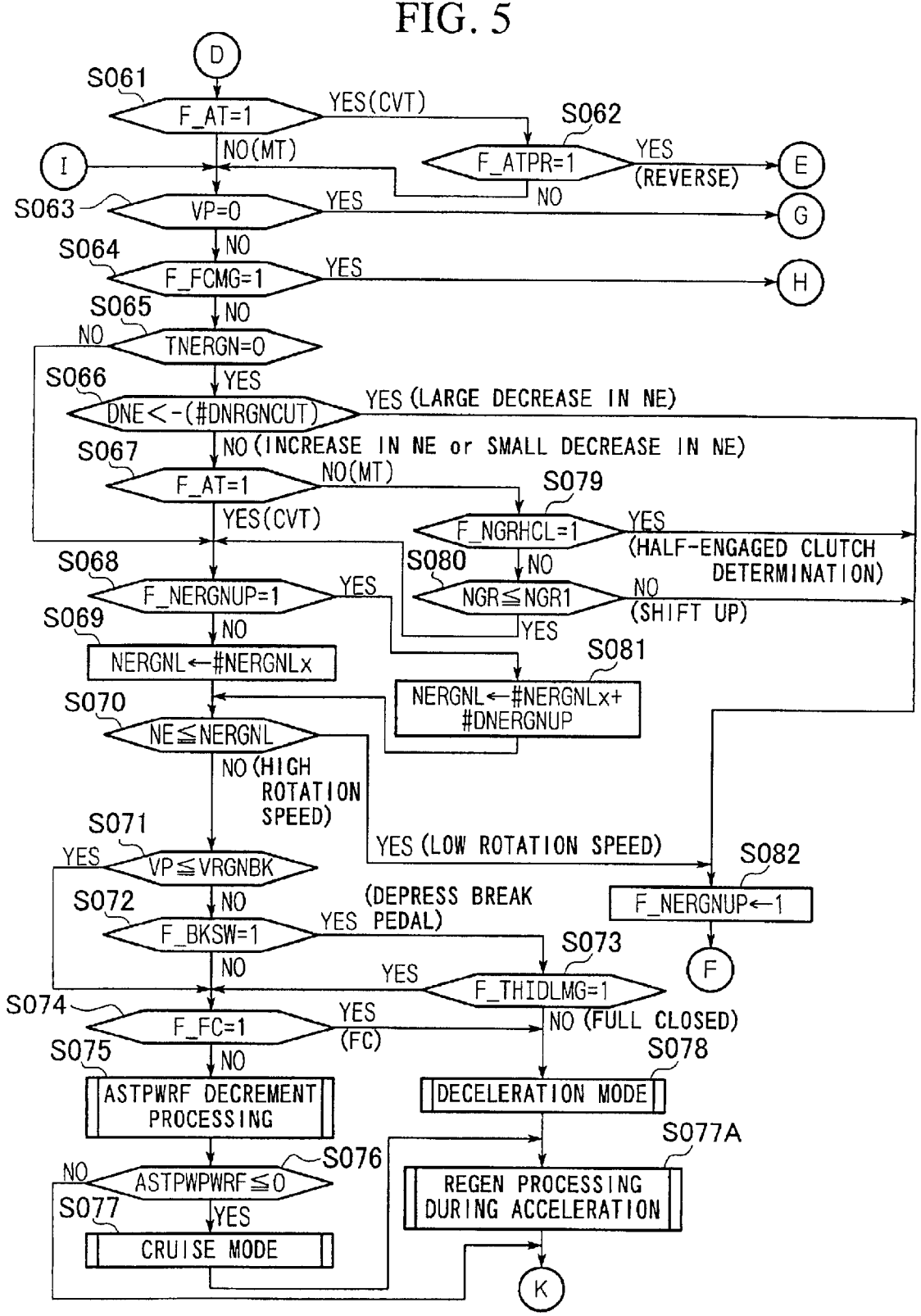
FIG. 5 is a flow chart showing the MA (motor) basic mode of the embodiment of the present invention.

Next is a description of the MA (motor) basic modes based on the flow charts shown in FIG. 4 and FIG. 5. This processing is repeated at a predetermined cycle time.

Here, the MA (motor) basic modes are: "idle mode", "idle stop mode", "deceleration mode", "cruise mode" and "acceleration mode". In the idle mode, fuel supply is restarted after fuel cut to maintain the engine E in an idle condition, and in the idle stop mode, for example at the time the vehicle is stopped, the engine is stopped in a defined condition. Furthermore, in the deceleration mode, regenerative braking by the motor M is performed. In the acceleration mode, the engine E is assisted by the motor M, and in the cruise mode, the motor M is not driven so that the vehicle runs only by the driving force of the engine E. In the abovementioned deceleration mode, an all cylinders deactivated operation is executed.

In step S051 of FIG. 4, it is determined whether an MT/CVT determination flag F_AT is "1". When the determination is "YES" (indicating a CVT vehicle), the flow proceeds to step S060. When the determination is "NO" (indicating a MT vehicle), the flow proceeds to step S052.

In step S060, for CVT it is determined whether an in gear determination flag F_ATNP is "1". When the determination is "YES" (N or P position), the flow proceeds to step S083, and when the determination is "NO" (in gear), the flow proceeds to step S060A.

In step S060A, it is determined whether the gearshift is being operated (shift position cannot be determined due to the gear shift being operated) by determining whether a switch back flag F_VSWB is "1". When the determination is "YES" (being shifted), the flow proceeds to S085, shifts to "idle mode", and terminates. In idle mode, the engine E is maintained in an idle state. When the determination of step S060A is "NO" (not being shifted), the flow proceeds to step S053A.

In step S083, it is determined whether an engine stop control execution flag F_FCMG is "1", When the determination is "NO", the flow proceeds to the "idle mode" in step S085, and the control ends. When the determination of step S083 is "YES", the flow proceeds to step S084, shifts to the "idle stop mode", and the control terminates. In the idle stop mode, for example at the time the vehicle is stopped, the engine is stopped in a defined condition.

In step S052, it is determined whether a neutral position determination flag F_NSW is "1". When the determination is "YES" (neutral position), the flow proceeds to step S083, and when the determination is "NO" (in gear), the flow proceeds to step S053.

In step S053, it is determined whether a clutch engagement determination flag F_CLSW is "1". When the determination is "YES" (clutch is disengaged), the flow proceeds to step S083, and when the determination is "NO" (clutch is engaged), the flow proceeds to step S053A.

In step S053A, it is determined whether the remaining battery charge QBAT is greater than or equal to the low speed start determination remaining battery charge QBJAM. When the determination is "YES", the flow proceeds to step S054, and when the determination is "NO", the flow proceeds to step S053B.

In step S053B, it is determined whether a low speed start determination flag F_JAMST is "1". This low speed start determination flag F_JAMST is a flag whose setting becomes "1" when a vehicle start at a low speed and runs slowly. When the determination of step S053B is "YES", the flow proceeds to step S083. When the determination of step S053B is "NO", the flow proceeds to step S054. This is because, when a vehicle has a low remaining battery charge and departs slowly, and since it means that there is no intention to accelerate, idle mode or idle stop mode (generated either by the idle mode or stopping the engine by the abovementioned engine stop determination) is preferable in order to protect the battery.

In step S054, it is determined whether an idle determination flag F_THIDLMG is "1". When the determination is "NO" (fully closed), the flow proceeds to step S061, and when the determination is "YES" (not fully closed), the flow proceeds to step S054A.

In step S054A, an engine rotation speed increase flag F_NERGNUP at the time of partially engaged clutch determination is set to "0", and the flow proceeds to step S055. Here, this engine rotation speed increase flag F_NERGNUP at the time of partially engaged clutch determination is described later. In step S055, it is determined whether a motor assist determination flag F_MAST is "1". This flag judges whether the engine is to be assisted by the motor M. In the case of "1", it means that assist is required, and in the case of "0", assist is not required. Here, the assist trigger determination processing sets the motor assist determination flag.

When the determination of step S055 is "NO", the flow proceeds to step S061. When the determination of step S055 is "YES", the flow proceeds to step S056.

In step S061, it is determined whether the MT/CVT determination flag F_AT is "1". When the determination is "NO" (MT vehicle), the flow proceeds to step S063, and when the determination is "YES" (CVT vehicle), the flow proceeds to step S062.

In step S062, it is determined whether a reverse position determination flag F_ATPR is "1". When the determination is "YES" (reverse position), the flow proceeds to step S085, and when the determination is "NO" (position other than reverse), the flow proceeds to step S063.

In step S056, it is determined whether the MT/CVT determination flag F_AT is "1". When the determination is "YES" (CVT vehicle), the flow proceeds to step S057, and when the determination is "NO" (MT vehicle), the flow proceeds to step S067A.

In step S057, it is determined whether a brake ON determination flag F_BKSW is "1". When the determination is "YES" (brake ON), the flow proceeds to step S063, and when the determination is "NO" (brake OFF), the flow proceeds to step S057A.

In step S063, it is determined whether a vehicle speed VP is "0". When the determination is "YES", the flow proceeds to step S083, and when the determination is "NO", the flow proceeds to step S064.

In step S064, it is determined whether the engine stop control execution flag F_FCMG is "1". When the determination is "NO", the flow proceeds to step S065, and when the determination is "YES", the flow proceeds to step S084.

In step S065, it is determined whether a shift change forced REGEN release determination processing delay timer TNERGN is "0". When the determination is "YES", the flow proceeds to step S066, and when the determination is "NO", the flow proceeds to step S068.

In step S066, it is determined whether the rate of change of engine rotation speed DNE is less than the negative value of a DNE REGEN cut determination engine rotation speed #DNRGNCUT. Here, the DNE REGEN cut determination engine rotation speed #DNRGNCUT is the rate of change DNE of engine rotation speed NE which becomes a reference for determining whether the generation amount is to be subtracted, depending on the rate of change of engine rotation speed DNE.

When it is determined in step S066 that the decrease (rate of fall) of the engine rotation speed NE is high (YES), the flow proceeds to step S082. In step S082, the engine rotation speed increase flag F_NERGNUP for at the time of partially engaged clutch determination is set to "1", and the flow proceeds to step S085.

This engine rotation speed increase flag F_NERGNUP at the time of partially engaged clutch is provided in order to prevent hunting of frequently switching the rotation speed NE in the determination in step S70, which will be mentioned later, every time when the engine rotation speed of the partially engaged clutch is changed. The engine rotation speed increase flag F_NERGNUP for at the time of partially engaged clutch determination is set in order to clarify this.

When the determination of step S066 is that the engine rotation speed NE is increasing (up), or the decrease (rate of fall) of the engine rotation speed NE is low (no), the flow proceeds to step S067.

In step S067, it is determined whether the MT/CVT flag F_AT is "1". When the determination is "NO" (MT vehicle), the flow proceeds to step S079, and when the determination is "YES" (CVT vehicle), the flow proceeds to step S068.

In step S079, it is determined whether a partially engaged clutch determination flag F_NGRHCL is "1". When it is determined that the clutch is partially engaged (YES), the flow proceeds to step S082. In contrast, when it is determined that the clutch is not partially engaged (no), the flow proceeds to step S080.

In step S080, the previous gear position NGR and the present gear position NGR1 are compared, and it is determined whether there has been a shift up by comparison between the present and previous gear positions.

When the determination of step S080 is that the gear position has been shifted up (NO), the flow proceeds to step S082. When the determination of step S080 is that the gear position has not been shifted up between the previous and present times (YES), the flow proceeds to step S068. The reason that control shifts to step S082, and afterwards shifts to idle mode, in this manner when the clutch is partially engaged, is that if regeneration is performed in a partially engaged clutch state, there is a possibility of stalling the engine. Furthermore, the reason that the flow proceeds to step S082, and afterwards shifts to idle mode, in the case of shifting up, is that if regeneration is performed at the time of low engine rotation speed due to the shift up, there is a possibility of stalling the engine.

In step S068, it is determined whether the engine rotation speed increase flag F_NERGNUP for at the time that the partially engaged clutch determination is "1". When the determination is that an increase in engine rotation speed is required at the time of partially engaged clutch and the flag is set (=1, YES), the flow proceeds to step S081, wherein a revolution speed increase #DNERGNUP for preventing hunting is added to the charge engine rotation speed lower limit value #NERGNLx, which is set for each gear, this added value is set to the charge engine rotation speed lower limit value NERGNL, and the flow proceeds to step S070. When the determination of step S068 is that an increase in engine rotation speed is not required at the time of partially engaged clutch determination, and the flag is reset (=0, NO), the flow proceeds to step S069, and the charge engine rotation speed lower limit value #NERGNLx, which is set for each gear, is set to the charge engine rotation speed lower limit value NERGNL, and the flow proceeds to step S070.

Then, in step S070 it is determined whether the engine rotation speed NE is less than or equal to the charge engine rotation speed lower limit value NERGNL. When the determination is that it is rotating slowly (NE≦NERGNL, YES), the flow proceeds to step S082. When the determination is that the rotation speed is high (NE>NERGNL, no), the flow proceeds to step S071.

In step S057A, it is determined whether a scramble assist request flag F_MASTSCR is "1". This scramble assist is for improving the perceived feeling of acceleration by increasing the assist amount temporarily at the time of acceleration. Basically, when the rate of throttle change is high, the arrangement is such that the scramble assist request flag F_MASTSCR is set to "1".

When the determination of step S057A is "NO", the acceleration REGEN processing is performed in step S057B, and the flow proceeds to step S057D. Furthermore, when the determination of step S057A is "YES", subtraction processing for a final charge instruction value REGENF is performed in step S057C, and the flow proceeds to step S058.

In step S057D, it is determined whether an acceleration REGEN processing flag F_ACCRGN is "1". When the determination is "YES" (processing has been performed), the flow proceeds to step S058, and when the determination is "NO" (processing has not been performed), the flow proceeds to step S057C.

In step S058, it is determined whether the final charge instruction value REGENF is less than or equal to "0". When the determination is "YES", the flow proceeds to "acceleration mode" in step S059. In acceleration mode, the engine E is assisted by the motor M, and the flow proceeds to step S059A. When the determination of step S058 is "NO", the control ends.

In step S059A, it is determined whether an assist permit flag F_ACCAST is "1". When the determination is "YES", the control ends, and when the determination is "NO", the flow proceeds to step S059B.

In step S059B, it is determined whether a start assist permit flag F_STRAST is "1". When the determination is "YES", the control ends, and when the determination is "NO", the flow proceeds to step S059C.

In step S059C, it is determined whether a scramble assist permit flag F_SCRAST is "1". When the determination is "YES", the control ends, and when the determination is "NO", the flow proceeds to step S059D.

In step S059D, it is determined whether a cylinder deactivation resumption assist permit flag F_RCSAST is "1". When the determination is "YES", the control ends, and when the determination is "NO", the flow proceeds to step S063. Here, when the cylinder deactivated operation resumption assist permit flag F_RCSAST is "1", it means that an assist by the motor is permitted when shifting from the all cylinders deactivated operation to be described later to the all cylinder (normal) operation.

In step S071, it is determined whether the vehicle speed VP is less than or equal to the deceleration mode brake determination lower vehicle speed limit #VRGNBK. Here, this deceleration mode brake determination lower vehicle speed limit #VRGNBK is a value with hysteresis. When the determination is that the vehicle speed VP≦the deceleration mode brake determination lower vehicle speed limit #VRGNBK (YES), the flow proceeds to step S074. When the determination in step S071 is that the vehicle speed VP>the deceleration mode brake determination lower vehicle speed limit #VRGNBK (NO), the flow proceeds to step S072.

In step S072, it is determined whether a brake on determination flag F_BKSW is "1". When the determination is "YES", the flow proceeds to step S073, and when the determination is "NO", the flow proceeds to step S074.

In step S073, it is determined whether an idle determination flag F_THIDLMG is "1". When the determination is "NO" (throttle is fully closed), the flow proceeds to "deceleration mode" in step S078, acceleration REGEN processing is performed in step S077A, and the control ends. Here, in deceleration mode, regenerative braking (deceleration regeneration permit flag F_DECRGN=1) is performed by the motor M. However, in deceleration mode, the all cylinders are deactivated, so that the amount of regeneration by the motor M can be increased by the amount that engine friction is reduced. When the determination of step S073 is "YES" (throttle is not fully closed), the flow proceeds to step S074.

In step S074, it is determined whether a fuel cut flag F_FC is "1". This flag is a fuel cut determination flag, which becomes "1" when regeneration by the motor M is performed in "deceleration mode" in step S078, and cuts the fuel. If the result of the determination in step S074 is that deceleration fuel cut is in effect (YES), the flow proceeds to step S078. If the result of the determination in step S074 is that fuel cut is not in effect (NO), the flow proceeds to step S075, where the final assist instruction value ASTPWRF is subtracted, and then proceeds to step S076.

In step S076, it is determined whether the final assist instruction value ASTPWRF is less than or equal to "0". When the determination is "YES", the control shifts to the "cruise mode" in step S077, acceleration REGEN processing is performed in step S077A, and the control ends. In the cruise mode, the motor M is not driven and the vehicle runs under the driving force of the engine E. Furthermore, the battery 3 may be charged by regenerative operation of the motor M or by using the motor as a generator depending on the running conditions of the vehicle.

When the determination of step S076 is "NO", the control ends.

[All Cylinders Deactivated Operation Switching Execution Processing]

Figure 6:
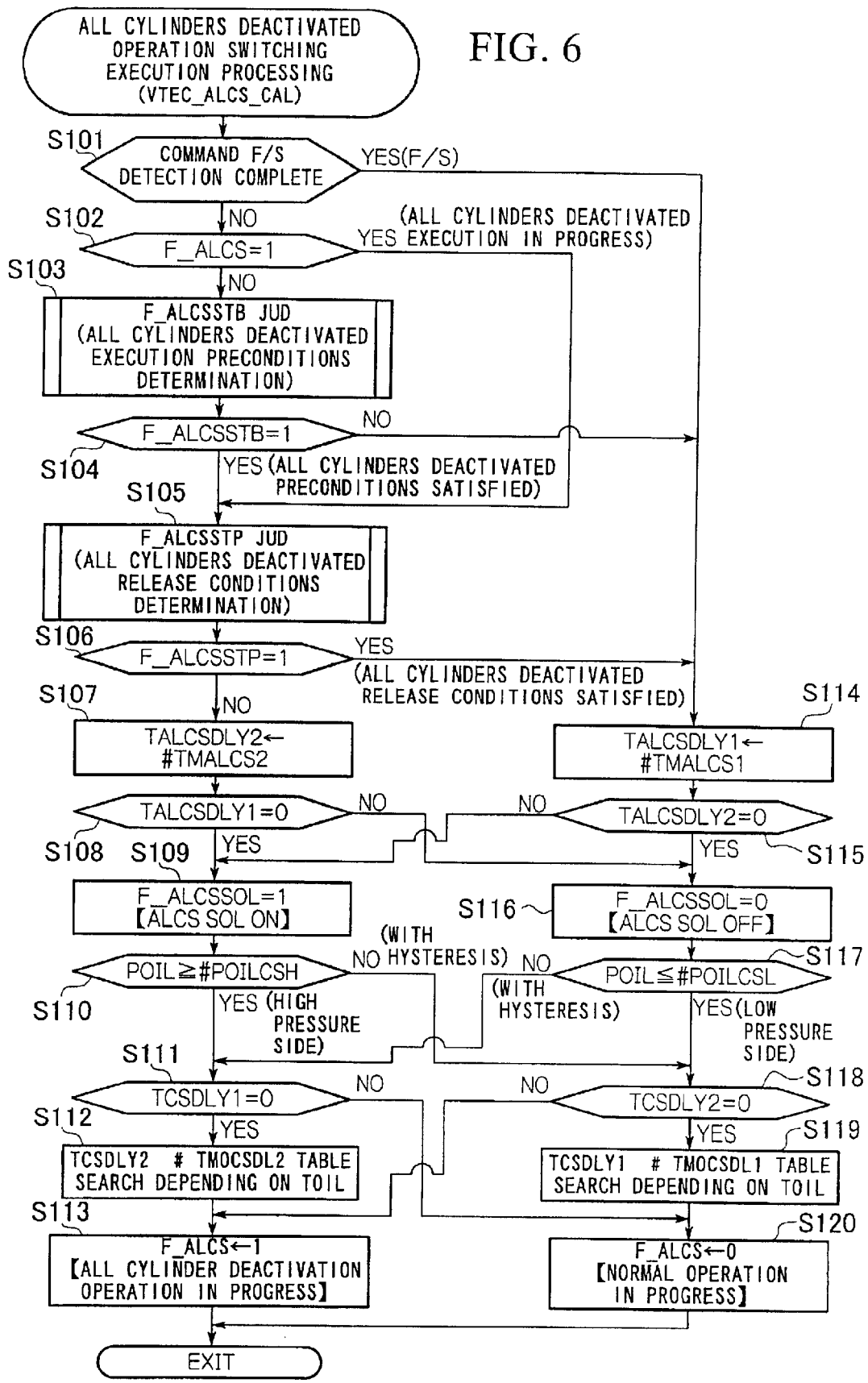
FIG. 6 is a flow chart showing all cylinders deactivated operation switching execution processing of the embodiment of the present invention.

Next, an all cylinders deactivated operation switching execution processing based on FIG. 6 is described.

Here, the all cylinders deactivated operation means an operation that closes the intake valves and exhaust valves by the aforementioned variable valve timing system VT at the time of deceleration regeneration under certain conditions, and is performed in order to reduce engine friction and to increase the amount of deceleration regeneration. In the following flow chart, a flag (the all cylinders deactivation execution flag F_ALCS) is set and reset to switch between the all cylinders deactivated operation and the normal operation that does not deactivate the cylinders, in a predetermined cycle time. The all cylinders deactivated execution flag F_ALCS constitutes a cylinders deactivation determination device.

In step S101, it is determined whether assigned F/S (fail safe) detection is completed. When the determination is "NO", the flow proceeds to step S102, and when the determination is "YES", the flow proceeds to step S114. This is because if there is any abnormality, all cylinders deactivated operation should not be executed.

In step S102, it is determined whether the all cylinders deactivated operation is active by determining whether the all cylinders deactivation execution flag F_ALCS is "1". The all cylinders deactivation execution flag F_ALCS is a flag set in this flow chart. When the flag is set to "1", the all cylinders deactivated operation is performed, and in the case of "0", all cylinders deactivated operation is not performed, but the normal operation is performed.

When the determination of step S102 is "YES", and all cylinders deactivated operation is in effect, the flow proceeds to step S105. Accordingly, if all cylinders deactivated operation is judged to be in effect (F_ALCS=1) by an all cylinders deactivation execution previous condition determination to be mentioned later, the all cylinders deactivation previous condition determination is not performed. When the determination of step S102 is "NO", and the all cylinders deactivation is not in effect, in step S103 an all cylinders deactivation execution previous condition determination (F_ALCSSTB_JUD) is performed, and the flow proceeds to step S104. All cylinders are deactivated only when the previous condition is satisfied by the all cylinders deactivated execution previous condition determination.

In step S104, it is determined whether the all cylinders deactivation standby flag F_ALCSSTB is "1". This flag is set to "1" when the previous condition is satisfied by the determination in step S103, and is "0" when it is not satisfied. When the determination of step S104 is "YES", since the previous condition is satisfied, the flow proceeds to step S105. When the determination of step S104 is "NO", since the previous condition is not satisfied, the flow proceeds to step S114.

In step S105, an all cylinders deactivation release condition determination (F_ALCSSTP_JUD), to be described later, is performed, and the flow proceeds to step S106. When the release condition is satisfied by this all cylinders deactivated operation release condition determination, the all cylinders deactivated operation is not executed. The all cylinders deactivated operation release condition determination is always performed when the processing of FIG. 6 is performed, which is different from the all cylinders deactivation previous condition determination.

In step S106, it is determined whether an all cylinders deactivation release condition satisfaction flag F_ALCSSTP is "1". This flag is set to "1" when the release condition is satisfied by the determination in step S105, and is set to "0" when not satisfied. When the determination of step S106 is "YES", since the release condition is satisfied, the flow proceeds to step S114. When the determination of step S106 is "NO", since the release condition is not satisfied, the flow proceeds to step S107.

In step S107, a solenoid off delay timer TALCSDLY2 for the aforementioned spool valve SV is set to a predetermined value #TMALCS2, and the flow proceeds to step S108. This is to ensure a certain time period when the all cylinders deactivated operation is shifted to normal operation from the determination in step S105 is completed until the solenoid of the spool valve SV finishes being turned off in step S116 to be mentioned later.

In step S108, it is determined whether a solenoid on delay timer TALCSDLY1 to be described later is "0". When the determination is "YES", since a certain time has passed, the flow proceeds to step S109. When the determination of step S108 is "NO", since a certain time has not passed, the flow proceeds to step S116.

In step S109, an all cylinders deactivation solenoid flag F_ALCSSOL is set to "1" (all cylinders deactivation solenoid of the spool valve SV is turned on), and the flow proceeds to step S110. This all cylinders deactivation solenoid flag F_ALCSSOL constitutes a cylinder deactivated operation detecting device.

In step S110, it is determined by an oil pressure sensor whether oil pressure is actually generated by an ON actuation of the solenoid for executing the all cylinder deactivated operation. In practice, it is determined whether the engine oil pressure POIL is greater than or equal to an all cylinders deactivated operation execution determination oil pressure #POILCSH (for example, it is determined whether it is greater than or equal to 137 kPa (=1.4 kg/cm$^2$)). When the determination is "YES", which means that the pressure is on the high pressure side, the flow proceeds to step S111. When the determination is "NO" (with hysteresis), the flow proceeds to step S118. Here, it is also possible to determined using an oil switch instead of an oil pressure sensor.

In step S111, it is determined whether the all cylinders deactivated operation execution delay timer TCSDLY1 is "0" in order to ensure a certain time period from the time that the spool valve SV is switched on until the oil pressure is applied. When the determination is "YES", the flow proceeds to step S112. When the determination is "NO", the flow proceeds to step S120.

In step S112, an all cylinders deactivated operation release delay timer TCSDLY2 is set to a timer value #TMOCSDL2 retrieved from a look up table showing the relationship between the time value and the oil temperature TOIL measured by an oil temperature sensor. This is because the oil temperature has an influence on the operating speed. For instance, if the oil temperature is low, it takes longer for the oil pressure to rise. Therefore this timer value #TMOCSDL2 increases as the oil temperature decreases.

Then, in step S113 the all cylinders deactivation execution flag F_ALCS is set to "1", and the control ends. Note that in step S112, the aforementioned timer value may be retrieved based on engine temperature instead of oil temperature.

In step S114, the solenoid on delay timer TALCSDLY1 is set to a predetermined value #TMALCS1, and the flow proceeds to step S115. This is to ensure a certain time period between the time when the determination in step S105 is completed and the solenoid of the spool valve SV is turned on in step S109, when normal operation changes to the all cylinders deactivated operation.

In step S115, it is determined whether the solenoid off delay timer TALCSDLY2 is "0". When the determination is "YES", since a certain time has passed, the flow proceeds to step S116. When the determination of step S115 is "NO", since a certain time has not passed, the flow proceeds to step S109.

In step S116, the all cylinders deactivation solenoid flag F_ALCSSOL is set to "1" (all cylinders deactivation solenoid of the spool valve SV is turned off), and the flow proceeds to step S117.

In step S117, it is judged by the oil pressure sensor whether oil pressure is actually generated by turning off the solenoid for the all cylinder deactivated operation. In practice, it is determined whether the engine oil pressure POIL is less than or equal to the all cylinders deactivated operation release determination oil pressure #POILCSL (for example, 98 kPa (=1.0 kg/cm$^2$)). When the determination is "YES", which means on the low pressure side, the flow proceeds to step S118. When the determination is "NO" (there is hysteresis), the flow proceeds to step S111. In this case, it is also possible to use an oil switch instead of an oil pressure sensor.

In step S118, it is determined whether the all cylinders deactivated operation execution delay timer TCSDLY2 is "0" in order to ensure a certain time period from the time that the spool valve SV is switched off until the oil pressure is released. When the determination is "YES", the flow proceeds to step S119. When the determination is "NO", the flow proceeds to step S113.

In step S119, the all cylinders deactivated operation execution delay timer TCSDLY1 is set to a timer value #TMOCSDL1 retrieved from a look up table showin the relationship between the operation time and the oil temperature TOIL measured by an oil temperature sensor. This is because oil temperature has an influence on the delay of the operating time. For instance if the oil temperature is low, it takes longer for the oil pressure to operate the valve. Therefore this timer value #TMOCSDL1 increases as the oil temperature decreases.

Then, in step S120, the all cylinders deactivated operation execution flag F_ALCS is set to "0", and the control ends. Here, in step S119 the aforementioned timer value may be retrieved based on the engine water temperature instead of oil temperature.

[All Cylinder Deactivation Previous Condition Execution Determination Processing]

Figure 7:
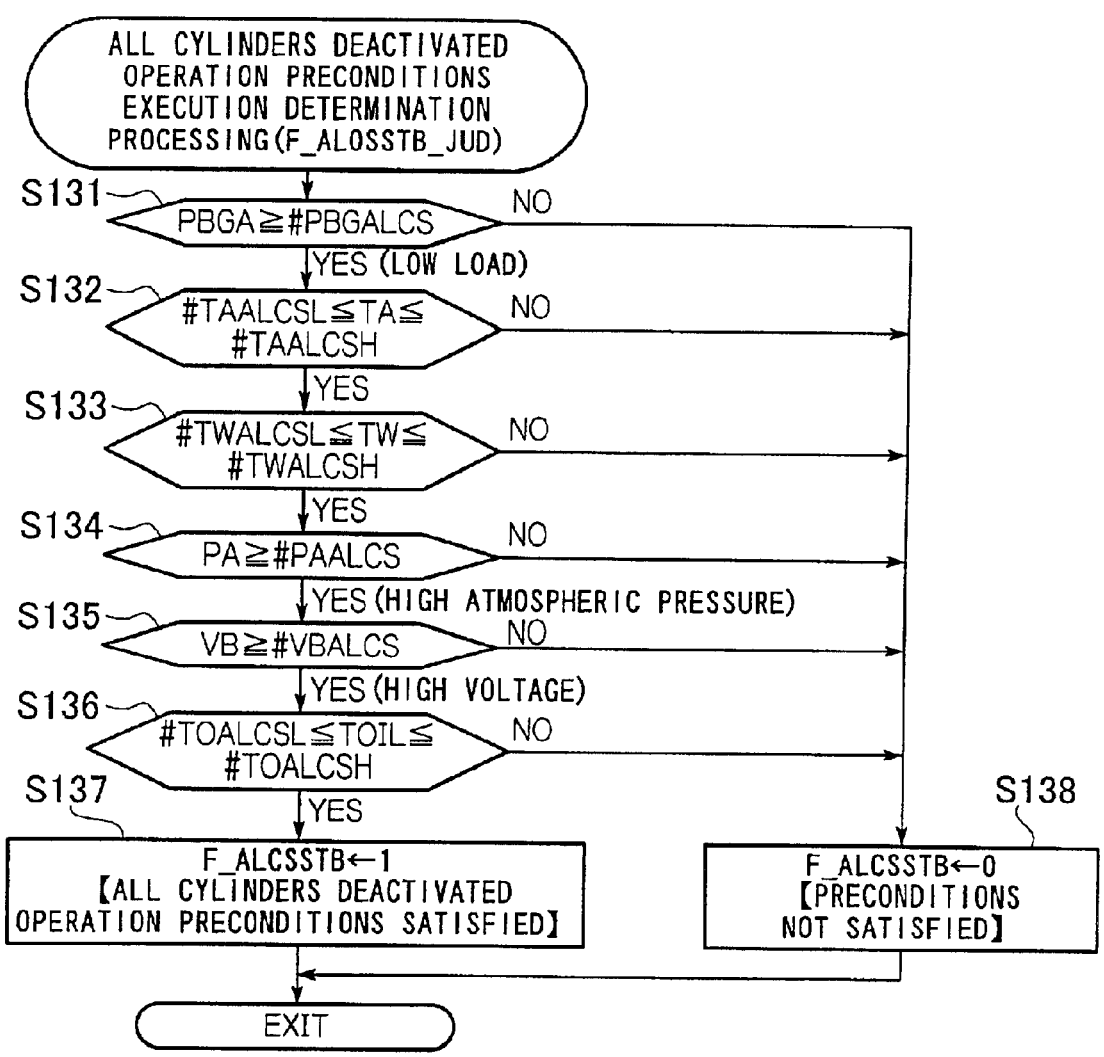
FIG. 7 is a flow chart showing all cylinders deactivated operation previous condition execution determination processing of the embodiment of the present invention.

Next, the all cylinders deactivation operation previous condition execution determination processing in step S103 of FIG. 6 is explained with reference to FIG. 7. This processing is repeated at a predetermined cycle time.

In step S131, it is determined whether the suction pipe negative pressure PBGA is greater than or equal to an all cylinders deactivated operation execution upper negative pressure limit #PBGALCS (for example, −40 kPa (=−300 mmHg)). This is because if the engine load is high, it is not desirable to perform the all cylinders deactivated operation. When the determination of step S131 is "YES" (low load), the flow proceeds to step S132, and when the determination is "NO", the flow proceeds to step S138.

In step S138, since the all cylinders deactivated operation previous condition is not satisfied, the all cylinders deactivation standby flag F_ALCSSTB is set to "0", and the control ends.

In step S132, it is determined whether an outside air temperature TA is within a predetermined range (all cylinders deactivated operation execution lower air temperature limit #TAALCSL (for example 0° C.)≦TA≦all cylinders deactivated operation execution upper air temperature limit #TAALCSH (for example 50° C.)). When the determination of step S132 indicates that the outside air temperature TA is within the predetermined range, the flow proceeds to step S133. When the determination is that the outside air temperature is outside of the predetermined range, the flow proceeds to step S138. This is because if the all cylinders deactivated operation is performed in a case that the outside air temperature TA is lower than the all cylinders deactivated operation execution lower air temperature limit #TAALCSL, or higher than the all cylinders deactivated operation execution upper air temperature limit #TAALCSH, the engine becomes unstable.

In step S133, it is determined whether a cooling water temperature TW is within a predetermined range (all cylinders deactivated operation execution lower cooling water temperature limit #TWALCSL (for example 70° C.)≦TW≦all cylinders deactivated operation execution upper cooling water temperature limit #TAALCSH (for example 100° C.)). When the determination of step S133 is that the cooling water temperature TW is within the predetermined range, the flow proceeds to step S134. When it is outside of the predetermined range, the flow proceeds to step S138. This is because if the all cylinders deactivated operation is performed in a case where the cooling water temperature TW is lower than the all cylinders deactivation execution lower cooling water temperature limit #TWALCSL, or higher than the all cylinders deactivation execution upper cooling water temperature limit #TWALCSH, the engine becomes unstable.

In step S134, it is determined whether atmospheric pressure PA is greater than or equal to an all cylinders deactivated operation execution upper atmospheric pressure limit #PAALCS (for example 77.3 kPa (−580 mmHg)). When the determination of step S134 is "YES" (high atmospheric pressure), the flow proceeds to step S135, and when the determination is "NO", the flow proceeds to step S138. This is because when atmospheric pressure is low, it is not desirable to perform the all cylinder deactivated operation. (For example, because there is a possibility of not ensuring a sufficient level of the brake master power negative pressure at the time of brake operation.)

In step S135, it is determined whether the voltage VB of a 12 volt auxiliary battery 4 is greater than or equal to an all cylinders deactivation execution upper voltage limit #VBALCS (for example 10.5V). When the determination is "YES" (high voltage), the flow proceeds to step S136, and when the determination is "NO", the flow proceeds to step S138. This is because if the voltage VB of the 12 volt auxiliary battery 4 is less than a predetermined value, the responsiveness of the spool valve SV deteriorates. This is to counter the possibility of the battery voltage falling or the battery deteriorating in a low temperature environment.

In step S136, it is determined whether the oil temperature TOIL is within a predetermined range (all cylinders deactivated operation execution lower oil temperature limit #TOALCSL (for example 70° C.)≦TOIL≦all cylinders deactivated operation execution upper oil temperature limit #TOALCSH (for example 100° C.)). When the determination of step S136 is that the oil temperature TOIL is within the predetermined range, the flow proceeds to step S137. When it is outside of the predetermined range, the flow proceeds to step S138. This is because if the all cylinders deactivated operation is performed when the oil temperature TOIL is lower than the all cylinders deactivation execution lower oil temperature limit #TOALCSL, or higher than the all cylinders deactivated operation execution upper oil temperature limit #TOALCSH, the response for switching between the engine normal operation and the all cylinders deactivated operation would be unstable.

In step S137, since the all cylinders deactivation previous condition is satisfied, the all cylinders deactivation standby flag F_ALCSSTB is set to "1", and the control ends.

[All Cylinder Deactivation Release Condition Determination Processing]

Next, the all cylinders deactivated operation release condition determination processing in step S105 of FIG. 6 is described with reference to FIG. 8. This processing is repeated at a predetermined cycle time.

In step S141, it is determined whether the fuel cut flag F_FC is "1". When the determination of step S141 is "YES", the flow proceeds to step S142, and when the determination is "NO", the flow proceeds to step S157. This determination is because the all cylinders deactivated operation is executed for reducing engine friction at the time of fuel cut during deceleration, and for increasing the amount of regeneration power corresponding to the power reduced by the all cylinders deactivated operation.

In step S157, since the all cylinders deactivated operation release condition is satisfied, the all cylinders deactivation release condition satisfaction flag F_ALCSSTB is set to "1", and the control ends.

In step S142, it is determined whether deceleration regeneration is in effect (deceleration regeneration permit flag F_DECRGN=1). When the determination of step S141 is "YES", the flow proceeds to step S143, and when the determination is "NO", the flow proceeds to step S157.

In step S143, it is determined whether the MT/CVT determination flag F_AT is "1". When the determination is "NO" (MT vehicle), the flow proceeds to step S144. When the determination is "YES" (an AT/CVT vehicle), the flow proceeds to step S155.

In step S155, it is determined whether the in gear determination flag F_ATNP is "1". When the determination is "NO" (in gear), the flow proceeds to step S156. When the determination is "YES" (N or P position), the flow proceeds to step S157.

In step S156, it is determined whether the reverse position determination flag F_ATPR is "1". When the determination is "YES" (reverse position), the flow proceeds to step S157. When the determination is "NO" (position other than reverse), the flow proceeds to step S146.

The all cylinders deactivation operation in the N or P position and reverse position is released by the processing of step S155 and step S156.

In step S144, it is determined whether the previous gear position NGR is higher than the all cylinders deactivated operation continuation lower gear position limit #NGRALCS (including this position, for example third gear). When the determination is "YES" (higher gear), the flow proceeds to step S145, and when the determination is "NO" (lower gear), the flow proceeds to step S157. This is to avoid stopping the cylinders frequently due to a reduction in the regeneration rate, or traffic congestion and the like, in a low gear.

In step S145, it is determined whether the partially engaged clutch determination flag F_NGRHCL is "1" (partially engaged clutch). When the determination is "YES" (partially engaged clutch), the flow proceeds to step S157, and when the determination is "NO", the flow proceeds to step S156. Accordingly, it is possible to prevent unnecessarily deactivating the cylinders which causes errors such as, for example, stalling the engine by stopping the vehicle on a partially engaged clutch, or changing gear while accelerating on a partially engaged clutch.

In step S146, it is determined whether the rate of change DNE of the engine rotation speed is less than or equal to the negative value of an all cylinders deactivation execution upper engine rotation speed change range limit #DNEALCS (for example −100 rpm). When the determination is "YES" (rate of decrease of the engine rotation speed is high), the flow proceeds to step S157, and when the determination is "NO", the flow proceeds to step S148. This is to prevent the engine from stalling when all cylinders deactivated operation is performed when the rate of decrease of the engine rotation speed is high.

In step S148, it is determined whether the vehicle speed VP is within a predetermined range (the all cylinders deactivated operation continuation execution lower vehicle speed limit #VPALCSL (for example 10 km/h)≦VP≦all cylinders deactivated operation continuation execution upper vehicle speed limit #VPALCSH (for example 60 km/h)). As a result of the determination in step S148, if it is determined that the vehicle speed VP is within the predetermined range, the flow proceeds to step S149. If the vehicle speed VP is outside of the predetermined range, the flow proceeds to step S157. When the vehicle speed VP is lower than the all cylinders deactivated operation continuation execution lower vehicle speed limit #VPALCSL, or higher than the all cylinders deactivated operation continuation execution upper vehicle speed limit #VPALCSH, the all cylinders deactivated operation is released.

In step S149, it is determined whether the engine rotation speed is within a predetermined range (all cylinders deactivated operation continuation execution lower engine rotation speed limit #NALCSL (for example 800 rpm)≦NE≦all cylinders deactivated operation continuation execution upper engine rotation speed limit #NALCSH (for example 3000 rpm)). As a result of the determination in step S149, if it is determined that the engine rotation speed NE is within the predetermined range, the flow proceeds to step S150. If the engine rotation speed NE is outside of the predetermined range, the flow proceeds to step S157. When the engine rotation speed NE is lower than the all cylinders deactivated operation continuation execution lower engine rotation speed limit #NALCSL, or higher than the all cylinders deactivated operation continuation execution upper engine rotation speed limit #NALCSH, all cylinders deactivated operation is released. This is because if the engine rotation speed NE is low, there is a possibility that the regeneration efficiency is low, and that the oil pressure required for switching between the all cylinders deactivated operation and the normal operation cannot be ensured. Furthermore, this is because if the engine rotation speed NE is too high, the oil pressure becomes too high due to high revolution speed, and there is a possibility that the switch to the all cylinders deactivated operation cannot be performed. Moreover, this is because there is a possibility of deteriorating the consumption of the hydraulic fluid for the all cylinders deactivated operation.

In step S150, it is determined whether the brake master power internal negative pressure MPGA is greater than or equal to an all cylinders deactivated operation execution continuation execution upper negative pressure limit #MPALCS (for example −26.7 kPa (=−200 mmHg)). As a result of the determination in step S150, if the brake master power internal negative pressure MPGA is greater than or equal to the all cylinders deactivated operation continuation execution upper negative pressure limit #MPALCS (MPGA≧#MPACLS, YES), the flow proceeds to step S151. As a result of the determination in step S150, if the brake master power internal negative pressure MPGA is lower than the all cylinders deactivated operation continuation execution upper negative pressure limit #MPALCS (MPGA<#MPFCMG, NO), the flow proceeds to step S157. This is because it is not desirable to continue the all cylinders deactivated operation when a sufficient brake master power internal negative pressure MPGA cannot be obtained.

In step S151, it is determined whether the remaining battery charge QBAT is within a predetermined range (the all cylinders deactivated operation continuation execution lower remaining charge limit #QBALCSL (for example 30%)≦QBAT≦all cylinders deactivated operation continuation execution upper remaining charge limit #QBALCSH (for example 80%)). As a result of the determination in step S151, if the remaining battery charge QBAT is determined to be within the predetermined range, the flow proceeds to step S152. If the remaining battery charge QBAT is outside of the predetermined range, the flow proceeds to step S157. When the remaining battery charge QBAT is lower than the all cylinders deactivated operation continuation execution lower remaining charge limit #QBALCSL, or higher than the all cylinders deactivated operation continuation execution upper remaining charge limit #QBALCSH, the all cylinders deactivated operation is released. This is because if the remaining battery charge QBAT is too low, the energy required for motor assist, which is performed when resuming from the all cylinder deactivated operation, cannot be ensured. Furthermore, this is because if the remaining battery charge QBAT is too high, regeneration power cannot be obtained.

In step S152, it is determined whether the idle determination flag F_THIDLMG is "1". When the determination is "YES" (throttle is not fully closed), the flow proceeds to step S157, and when the determination is "NO" (throttle is fully closed), the flow proceeds to step S153. This is so that if the throttle opens even a little from the fully closed state, continuation of the all cylinders deactivated operation is released, in order thereby to enhance the drivability of the vehicle.

In step S153, it is determined whether the engine oil pressure POIL is greater than or equal to the all cylinders deactivated operation continuation execution lower oil pressure limit #POALCS (for example 98 to 137 kPa (1.0 to 1.4 kg/cm$^2$) with hysteresis). When the determination is "YES", the flow proceeds to step S154, and when the determination is "NO", the flow proceeds to step S157. This is because if the engine oil pressure POIL is lower than the all cylinders deactivated operation continuation execution lower oil pressure limit #POALCS, it is not possible to obtain a sufficient oil pressure (for example, oil pressure to operate the spool valve SV), to perform the cylinder deactivated operation.

In step S154, since the all cylinders deactivated operation release condition is not satisfied, the all cylinders deactivated operation release condition satisfaction flag F_ALCSSTP is set to "0" in order to continue all cylinder deactivated operation, and the control ends.

[Fuel Cut Execution Determination Processing]

Next, a fuel cut execution determination processing is described with reference to FIG. 9. This processing is repeated at a predetermined cycle time.

Normally, the fuel is cut when a certain condition is satisfied with an object of protecting the engine and improving the fuel consumption. However, a condition related to all cylinders deactivated operation is added to the determination processing for determining whether this fuel cut is to be performed.

In step S201, high revolution fuel cut execution determination processing is performed, and the flow proceeds to step S202. This fuel cut is performed to protect the engine when the engine rotates at high speed (for example, when the engine rotation speed NE is greater than 6200 rpm), and the setting and resetting of a high rotation fuel cut flag F_HNFC are performed by this processing.

In step S202, it is determined whether the high rotation fuel cut flag F_HNFC is "1". When the determination is "YES" (high revolution fuel cut satisfied), the flow proceeds to step S212, and when the determination is "NO", the flow proceeds to step S203.

In step S212, a fuel cut flag F_FC is set to "1", and the control ends. Here, when the fuel cut flag F_FC is "1", fuel injection is not performed. The fuel cut flag F_FC constitutes a fuel supply stop device.

In step S203, high vehicle speed fuel cut execution determination processing is performed, and the flow proceeds to step S204. This fuel cut is performed from the viewpoint of limiting speed when the vehicle speed is high (for example, greater than 180 km/h), and the setting and resetting of a high vehicle speed fuel cut flag F_HVFC are performed by this processing.

In step S204, it is determined whether the high vehicle speed fuel cut flag F_HVFC is "1". When the determination is "YES" (high vehicle speed fuel cut satisfied), the flow proceeds to step S212, and when the determination is "NO", the flow proceeds to step S205.

In step S205, deceleration fuel cut execution determination processing is performed, and the flow proceeds to step S206. This fuel cut is performed to improve fuel consumption when the vehicle is in deceleration, and the setting and resetting of the fuel cut flag F_FC is performed by this processing.

In step S206, it is determined whether the fuel cut flag F_FC is "1". When the determination is "YES", the flow proceeds to step S212, and when the determination is "NO", the flow proceeds to step S207. Here, when the fuel cut flag F_FC becomes "1" in the deceleration mode, the fuel is cut.

In step S207, it is determined whether the all cylinders deactivated operation execution flag F_ALCS is "1". When the determination is "YES" (during the all cylinder deactivated operation), the flow proceeds to step S212, and when the determination is "NO", the flow proceeds to step S208.

In step S208, it is determined whether the all cylinders deactivation solenoid flag F_ALCSSOL is "1". When the determination is "YES" (all cylinders deactivation solenoid on), the flow proceeds to step S212, and when the determination is "NO", the flow proceeds to step S208.

Accordingly, when the intake valve and exhaust valve are closed during all cylinders deactivated operation (F_ALCS=1) (step S207), and when the all cylinders deactivation solenoid flag F_ALCSSOL is "1" (step S208), fuel cut is continued.

Even if the all cylinders deactivated operation execution flag F_ALCS becomes "0" when resuming the normal operation from an the cylinders deactivated operation, during the time from when the all cylinders deactivation solenoid flag F_ALCSSOL is "0", that is the all cylinders deactivation solenoid is off, until the operation is restarted completely, there is a possibility that the cylinders are deactivated. Therefore, the arrangement is such that a determination of the all cylinders deactivation solenoid flag F_ALCSSOL is added in step S208, and when the all cylinders deactivation solenoid flag F_ALCSSOL becomes "0", fuel cut is released (F_FC=0).

In step S209, the fuel cut flag F_FC is set to "0", that is, fuel cut is released, and the control ends.

[Gradual Fuel Addition Coefficient Computation Processing When Resuming Fuel Supply]

Figure 10:
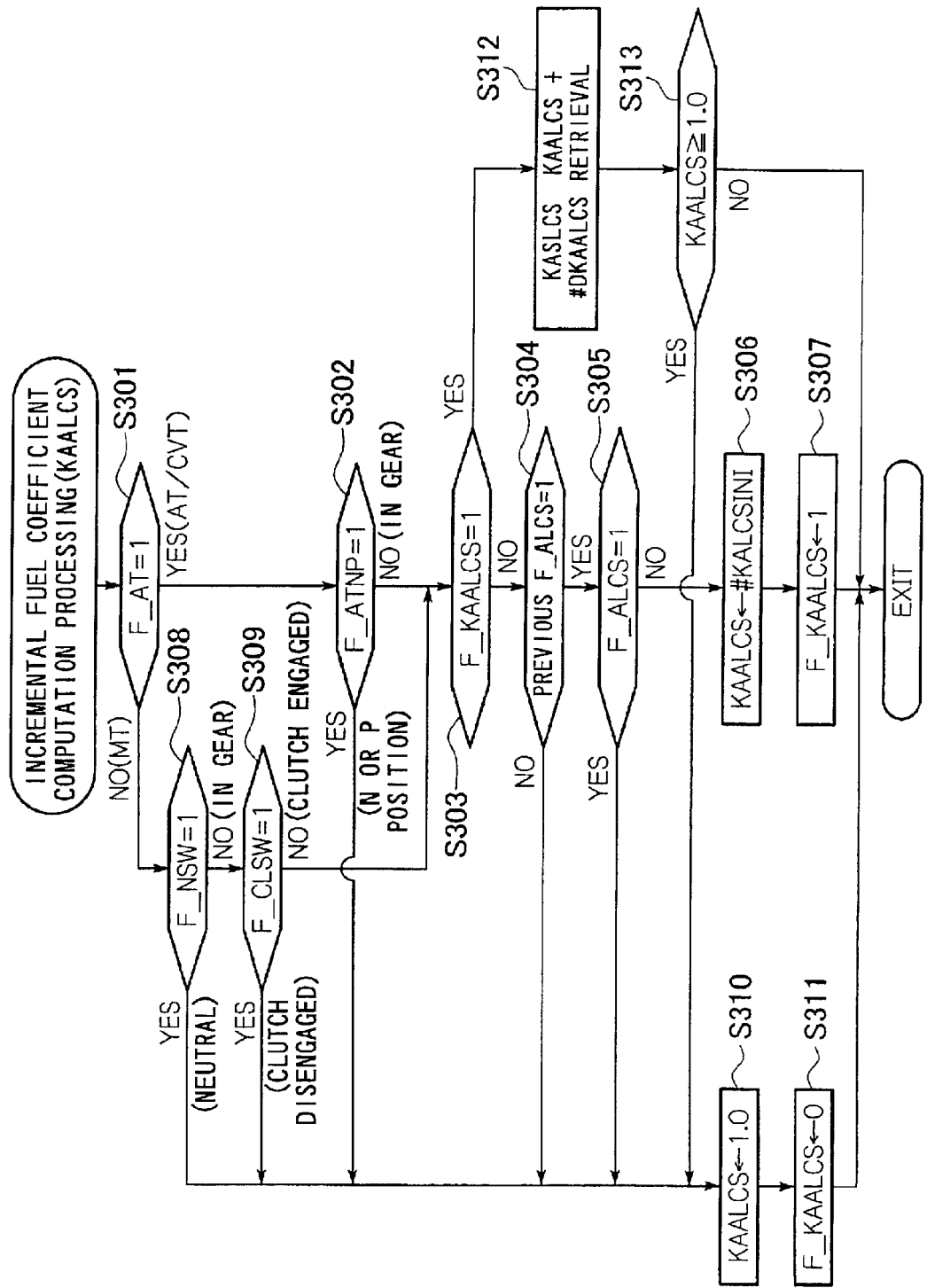
FIG. 10 is a flow chart showing an fuel gradual incremental fuel addition coefficient computation processing when restarting the fuel supply according to one embodiment of the present invention.

Next, gradual fuel incremental coefficient computation processing when resuming fuel supply from the all cylinders deactivated operation F/C (fuel cut) is described with reference to FIG. 10. When resuming the normal operation after the all cylinders deactivated operation, if the normal amount of fuel is supplied immediately after resumption (for example, if an amount of fuel is supplied corresponding to the engine rotation speed and engine output is generated corresponding to the fuel supply amount), a shock occurs. Therefore, the fuel supply amount is gradually increased to ensure a smooth changeover to normal operation.

In the following specific process, the setting of a gradual fuel addition coefficient KAALCS at the time of fuel resumption, and the setting and resetting of an incremental fuel flag F_KAALCS that indicates whether the fuel is added are performed. Here, the gradual fuel addition coefficient at the time of fuel resumption indicates a multiplication factor for a normal amount of fuel, and reaches a maximum of 1.0. This processing is repeated at a predetermined cycle time.

In step S301, it is determined whether the MT/CVT determination flag F_AT is "1". When the determination is "NO" (MT vehicle), the flow proceeds to step S308. When the determination is "YES" (AT/CVT vehicle), the flow proceeds to step S302.

In step S308, it is determined whether the neutral position determination flag F_NSW is "1". When the determination is "YES" (neutral position), the flow proceeds to step S310, and when the determination is "NO" (in gear), the flow proceeds to step S309.

In step S309, it is determined whether the clutch engagement determination flag F_CLSW is "1". When the determination is "YES" (clutch is disengaged), the flow proceeds to step S310, and when the determination is "NO" (clutch is engaged), the flow proceeds to step S303.

In step S310, the gradual fuel addition coefficient KAALCS at the time of fuel resumption is set to "1", in step S311 the gradual fuel addition coefficient flag F_KAALCS is set to "0", and the control ends. In this manner, when the gearbox is in the neutral position, or the clutch is disengaged in an MT vehicle, then even if the engine rotation speed NE is increased, the engine output is not transmitted to the driving wheels as a driving force, and hence there is no shock to the driver, and an unpleasant sensation does not occur. Therefore, the arrangement is such that a normal amount of fuel is injected as soon as possible in order to resume.

Here, the gradual fuel addition coefficient KAALCS=1.0 at the time of fuel resumption means the normal fuel injection amount. Furthermore, the case when the gradual fuel addition flag F_KAALCS is "1" means that the fuel is gradually increased, and the case when the flag value is "0" means that the fuel is not increased.

In step S302, it is determined whether the in gear determination flag F_ATNP is "1". When the determination is "NO" (in gear), the flow proceeds to sep S303. When the determination is "YES" (N or P position), the flow proceeds to step S310. Similarly to an MT vehicle, in a CVT vehicle, in the case of N or P position, even if the engine rotation speed NE increases, there is no unpleasant sensation, and hence additional increasing processing of fuel is not performed.

In step S303, it is determined whether the incremental fuel flag F_KAALCS is "1". When the determination is "YES", that is, the fuel is being added, the flow proceeds to step S312. When the determination is "NO", the flow proceeds to step S304.

In step S304, it is determined whether the previous all cylinders deactivated operation execution flag F_ALCS was "1". When the determination is "YES", the flow proceeds to step S305, and when the determination is "NO", the flow proceeds to step S310.

In step S305, it is determined whether the all cylinders deactivated operation execution flag F_ALCS is "1". When the determination is "YES", the flow proceeds to step S310, and when the determination is "NO", the flow proceeds to step S306.

In step S306, the gradual fuel addition coefficient KAALCS at the time of fuel resumption is set to an initial value #KALCSINI. That is, in the case of "YES" in step S304, and "NO" in step S305, that is, when the all cylinders deactivated operation is released, the initial value #KALCSINI is set. In step S307, the gradual fuel addition flag F_KAALCS is set to "1", and the control ends.

Figure 11:
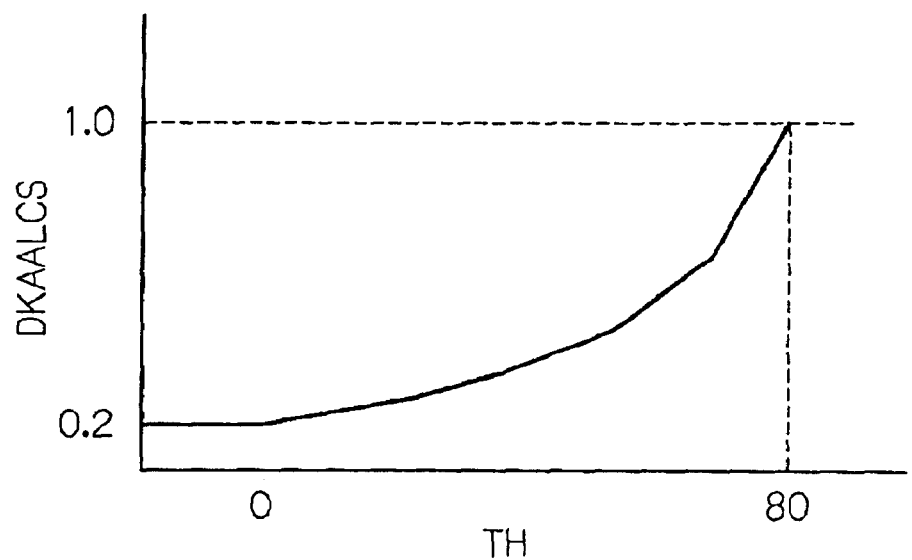
FIG. 11 is a graph showing the relationship between throttle opening TH and incremental amount #DKAALCS.

In step S312, the gradual fuel addition coefficient KAALCS at the time of fuel resumption is set by adding a predetermined amount #DKAALCS, which is retrieved from a look-up table depending on the throttle opening, and the flow proceeds to step S313. Here, the gradual fuel addtion coefficient KAALCS at the time of fuel resumption is a numerical value that increases depending on the throttle opening TH as shown in FIG. 11. Accordingly, when the throttle opening TH is large, a large gradual fuel additional amount #DKAALCS is set, and when the throttle opening TH is small, a small gradual fuel additional amount #DKAALCS is set. As a result, if the throttle opening is large, since the gradual additional amount #DKAALCS is large, it is possible to provide the driver with a driving sensation matching the throttle opening, that is, the driver's acceleration intention such as having a feeling of powerful acceleration.

In step S313, it is determined whether the gradual fuel additional coefficient KAALCS at the time of fuel resumption is greater than or equal to "1.0". When the determination is "YES", the flow proceeds to step S310, and when the determination is "NO", the control ends.

The operation of the abovementioned embodiment will be described.

Figure 8:
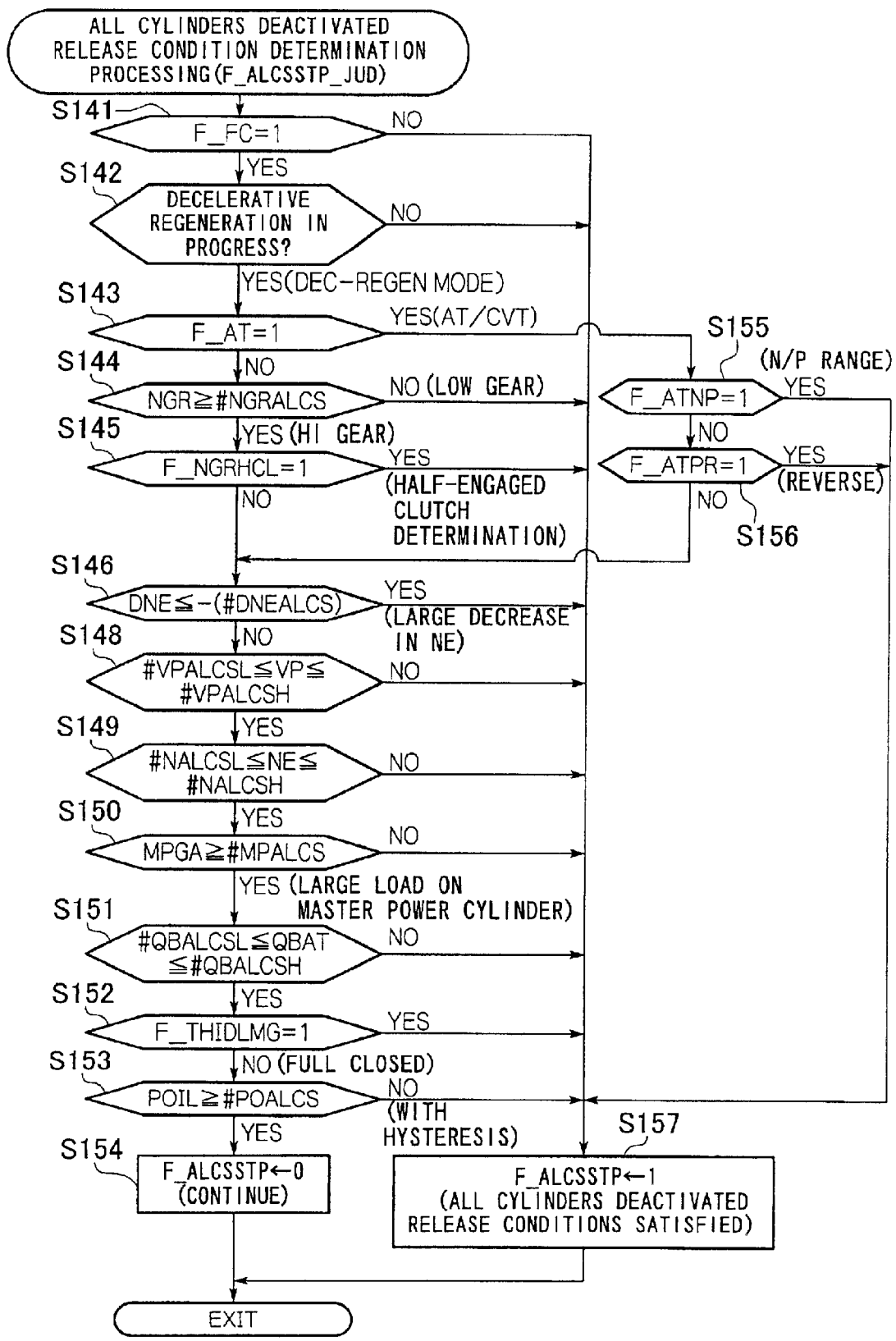
FIG. 8 is a flow chart showing all cylinders deactivated operation release condition determination processing of the embodiment of the present invention.

When the vehicle is traveling in a mode other than deceleration, the fuel cut flag F_FC is "0" in step S141 of FIG. 8, the all cylinders deactivated operation release condition is satisfied (F_ALCSSTP=1), and the determination in step S106 of FIG. 6 is "YES". Accordingly, in step S120 the all cylinders deactivated operation execution flag F_ALCS is "0", and all cylinders deactivated operation is not performed.

Figure 9:
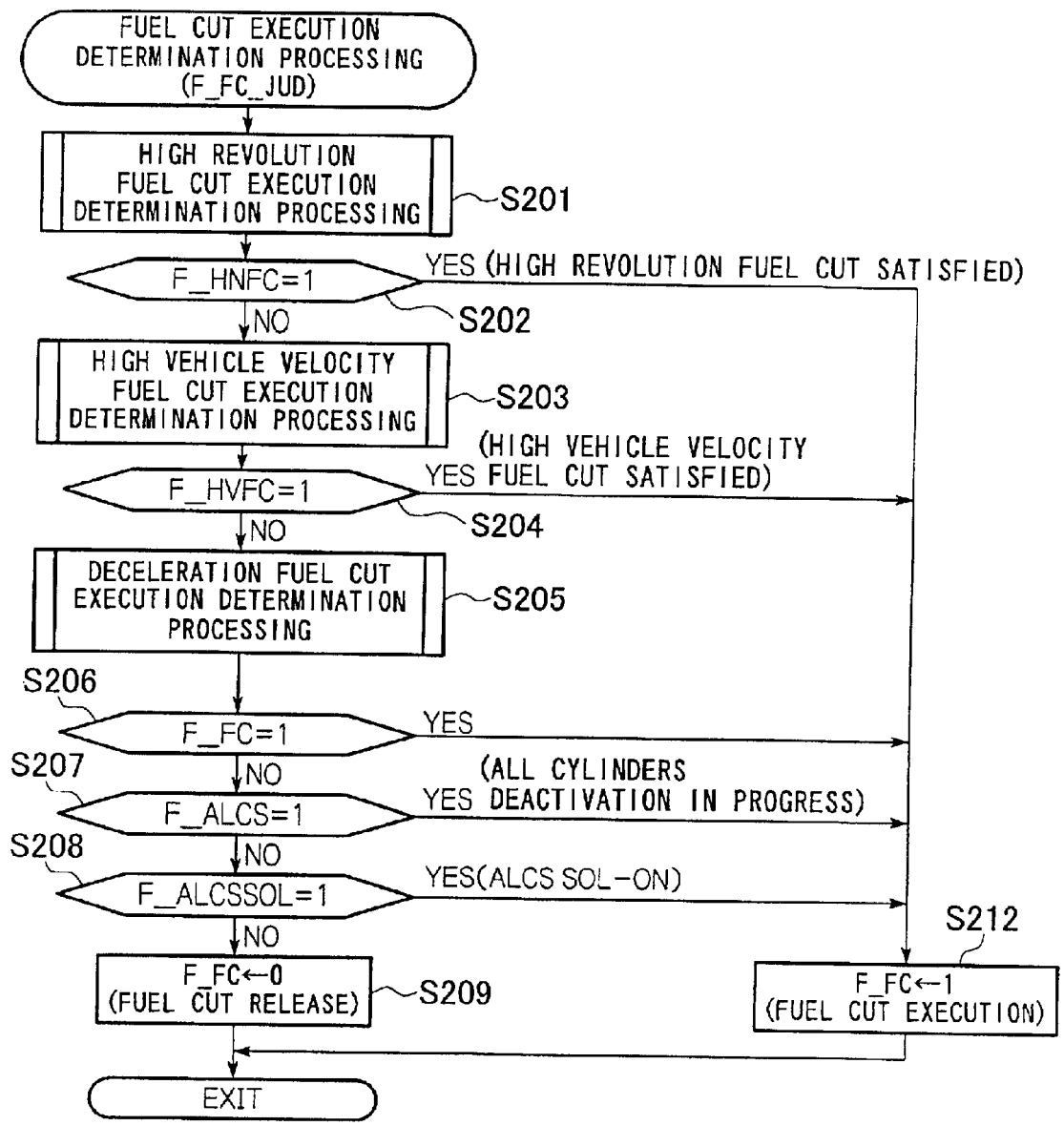
FIG. 9 is a flow chart showing fuel cut execution determination processing of the embodiment of the present invention.

On the other hand, when the vehicle is traveling in the deceleration regeneration mode (deceleration regeneration permit flag F_DECRGN=1), the fuel cut flag F_FC is "1" in step S141 of FIG. 8, and the fuel cut flag F_FC=1 in step S212 of FIG. 9. As a result, when the previous condition of all cylinders deactivated operation is satisfied in step S104 of FIG. 6, and the all cylinders deactivated operation release condition is not satisfied in step S106, the solenoid of the spool valve SV is turned on after a predetermined time (TALCSDLY1) has passed from this point of time. Then, when the oil pressure (POIL) becomes greater than or equal to a predetermined value (#POILCSH), the all cylinders deactivated operation execution flag F_ALCS becomes "1" in step S113 after a further predetermined time (TCSDLY1) has passed, and the all cylinders deactivated operation is performed.

Figure 12:
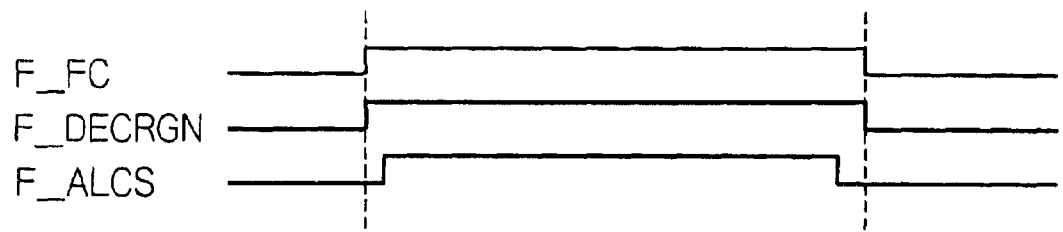
FIG. 12 is a timing diagram of the embodiment of the present invention.

As a result, after the fuel cut flag F_FC and the deceleration regeneration permit flag F_DECRGN become "1" in the timing diagram of FIG. 12, the all cylinders deactivated operation execution flag F_ALCS becomes "1".

Then, when the all cylinders deactivated operation release condition is satisfied during the all cylinders deactivated operation in step S106 of FIG. 6, the solenoid of the spool valve SV is turned off after a predetermined time (TALCSDLY2) has passed from this point of time. Then, the oil pressure (POIL) becomes less than or equal to a predetermined value (#POILCSL), the all cylinders deactivated operation execution flag F_ALCS becomes "0" in step S120 after a further predetermined time (TCSDLY2) has passed, and the normal operation is performed. Accordingly, as shown in FIG. 9, after the all cylinders deactivated operation execution flag F_ALCS and the all cylinders deactivated operation solenoid flag F_ALCSSOL become "0", then as shown by the timing chart of FIG. 12, the fuel cut flag F_FC (and deceleration regeneration permit flag F_DECRGN) become "0", that is, fuel cut is released, and normal operation is performed. Here, when switching to this normal operation, since fuel is fed in gradually, normal operation is entered smoothly and without a shock.

In the abovementioned embodiment, when all cylinders deactivated operation is determined by the all cylinders deactivated operation execution flag F_ALCS (=1) during deceleration fuel cut, it becomes possible to execute the cylinder deactivated operation by the variable valve timing system VT. Therefore, the all cylinders deactivated operation is performed together with cutting the fuel to limit fuel consumption, so that fuel consumption can be improved.

Furthermore, when the release of the all cylinders deactivated operation is determined by the all cylinders deactivated operation execution flag F_ALCS (=0), and an inoperative state of the variable valve timing system VT is determined by the all cylinders deactivated operation solenoid flag F_ALCSSOL, it is possible to cancel the fuel supply to the engine and later resume it. Therefore, fuel is not supplied during all cylinder deactivated operation, and hence it is possible to switch from all cylinders deactivated operation to normal operation smoothly without wasting fuel.

Then, since the variable valve timing system VT closes both the intake valve IV and the exhaust valve EV, pumping losses of the engine and friction loss of cylinders while executing the all cylinders deactivated operation are reduced, and it is possible to prevent fresh air from flowing into the exhaust system. Therefore, the efficiency of the power transmission is not reduced significantly, temperature drop in the catalytic converter is prevented compared with the case when fresh air is introduced, and hence fuel consumption can be greatly improved while optimally controlling the exhaust gas.

When the fuel supply to the engine is restarted from fuel supply stop release by the fuel supply stop device, by increasing the fuel gradually by an additional amount DKAALCS depending on the throttle opening TH, it is possible to prevent the fuel supply from increasing rapidly. As a result, there is no shock when resuming fuel supply, and it is possible to switch from the all cylinders deactivated operation to the normal operation smoothly.

Here, the present invention is not limited to the above-mentioned embodiment. For example, fuel may be increased gradually by an incremental amount DKAALCS depending on the accelerator pedal position instead of the throttle opening TH.

As described above, according to the first aspect of the invention, when the fuel supply to the engine is stopped by the fuel supply stop device, if the cylinder deactivated operation determination device judges the cylinder deactivated operation, the cylinder deactivated operation execution device can execute deactivated operation of the cylinders. Therefore, the fuel consumption is controlled by deactivating the cylinders together with stopping the fuel supply, and hence there is an effect that an improvement of fuel consumption can be achieved.

According to the second aspect of the invention, in a case where the cylinder deactivated operation determination device determined that the cylinder deactivated operation is released, and the cylinder deactivated operation detecting device detects an inoperative state of the cylinder deactivated operation execution device, stopping the fuel supply to the engine by releasing the fuel supply stop device, so that fuel supply can be restarted. Therefore, fuel is not supplied during cylinder deactivated operation, and there is an effect that switching from an all cylinders deactivated operation to normal operation can be performed smoothly without wasting fuel.

According to the third aspect of the invention, while executing the all cylinders deactivated operation, engine pumping losses and friction are reduced, and it is possible to prevent fresh air from flowing into the exhaust system. Therefore, the efficiency of the power transmission is not reduced significantly, temperature drop in the catalytic converter is prevented compared with the case where fresh air is introduced, and hence there is an effect that fuel consumption can be greatly improved while optimally controlling the exhaust gas.

According to the fourth aspect of the invention, when fuel supply is restarted by canceling the fuel supply stop to the engine by the fuel supply stop device, it is possible to prevent the fuel supply from increasing rapidly. As a result, there is no shock when resuming fuel supply, and hence there is an effect that switching from the cylinder deactivated operation to the normal operation can be performed smoothly.

What is claimed is:

1. A control apparatus for a hybrid vehicle comprising a driving power source composed of an engine and a motor, wherein fuel supply to the engine is stopped by a fuel supply stop device during deceleration, and the motor regenerates regeneration power during deceleration depending on the deceleration state, wherein said engine is a type of engine capable of executing cylinders deactivated operation for at least one cylinder, the control apparatus comprises;

a cylinder deactivated operation determination device for determining whether it is appropriate for said engine to enter a cylinders deactivated operation depending on the driving conditions of the vehicle; and a cylinder deactivated operation execution device for executing the cylinders deactivated operation of said engine when the cylinders deactivated operation is determined by said cylinder deactivated operation determination device, wherein when fuel supply to the engine is stopped by said fuel supply stop device during deceleration, the cylinders are deactivated based on said cylinder deactivated operation determination device and said cylinder deactivated operation execution device closes both the intake valves and exhaust valves of the cylinders, wherein the control apparatus further comprises a cylinder deactivated operation detecting device for detecting operation or non-operation of said cylinder deactivated operation execution device, wherein when said cylinder deactivated operation determination device determines that the cylinder deactivated operation is released, and said cylinder deactivated operation detecting device detects an inoperative state of said cylinder deactivated operation execution device, fuel supply stop to the engine by said fuel supply stop device is released, and wherein the control device further comprises a variable valve timing mechanism for changing the timing to close or open the intake and exhaust valves, and when said cylinder deactivated operation determination device determines that it is appropriate for the engine to enter a cylinder deactivated operation, fuel supply to the engine is stopped first, and said cylinder deactivated operation execution device then closes both intake valves and exhaust valves of the cylinders for executing the cylinder deactivation operation and, when said cylinder deactivated operation determination device determines that the cylinder deactivated operation is released, the variable timing mechanism changes timing to open both intake valves and exhaust valves of the cylinders first, and the fuel supply is then restarted in order to absorb shock when resuming fuel supply and switching from the cylinder deactivated operation to the normal operation.

2. The control apparatus for a hybrid vehicle according to claim 1, wherein when fuel supply is restarted by releasing the fuel supply stop to the engine by said fuel supply stop device, the fuel supply is gradually increased by a predetermined amount depending on the throttle opening.

3. A control apparatus of a hybrid vehicle according to claim 1, wherein said cylinders deactivated operation includes all cylinders deactivated operation.

* * * * *